United States Patent [19]

Noba

[11] Patent Number: 4,651,922
[45] Date of Patent: Mar. 24, 1987

[54] APPARATUS FOR CONTROLLING ROTATIONAL SPEED OF RADIATOR FAN

[75] Inventor: Masahiko Noba, Toyota, Japan

[73] Assignee: Toyota Jidosha Kabushiki Kaisha, Aichi, Japan

[21] Appl. No.: 855,691

[22] Filed: Apr. 25, 1986

[30] Foreign Application Priority Data

May 15, 1985 [JP] Japan .................................. 60-101506

[51] Int. Cl.⁴ .................................................. F01P 5/02
[52] U.S. Cl. ........................................ 236/35; 62/183; 123/41.12; 123/41.49
[58] Field of Search ............... 123/41.11, 41.12, 41.49; 236/35; 62/183

[56] References Cited

U.S. PATENT DOCUMENTS

| 4,168,456 | 9/1979 | Isobe | 123/41.12 |
| 4,313,402 | 2/1982 | Lehnhoff et al. | 123/41.49 |
| 4,378,760 | 4/1983 | Barge | 123/41.49 |
| 4,409,933 | 10/1983 | Inoue | 123/41.49 |
| 4,426,960 | 1/1984 | Hart | 123/41.49 |
| 4,549,504 | 10/1985 | Gaines et al. | 123/41.15 |
| 4,590,772 | 5/1986 | Nose et al. | 123/41.12 |
| 4,590,892 | 5/1986 | Nose et al. | 123/41.12 |

Primary Examiner—William A. Cuchlinski, Jr.
Attorney, Agent, or Firm—Parkhurst & Oliff

[57] ABSTRACT

A cooling system for a radiator in an internal combustion engine is provided with a pair of fans connected to a first motor for a small electric current and a second motor for a large electric current, respectively. Relays are provided for operating the first and/or second motor sequentially in accordance with the degree of cooling requirement of the engine. A delay device is provided for delaying the operation of the relay(s) for attaining a stronger cooling requirement for a predetermined short period just after the engine is started. A generation of rush current in the relay contacts is prevented.

7 Claims, 12 Drawing Figures

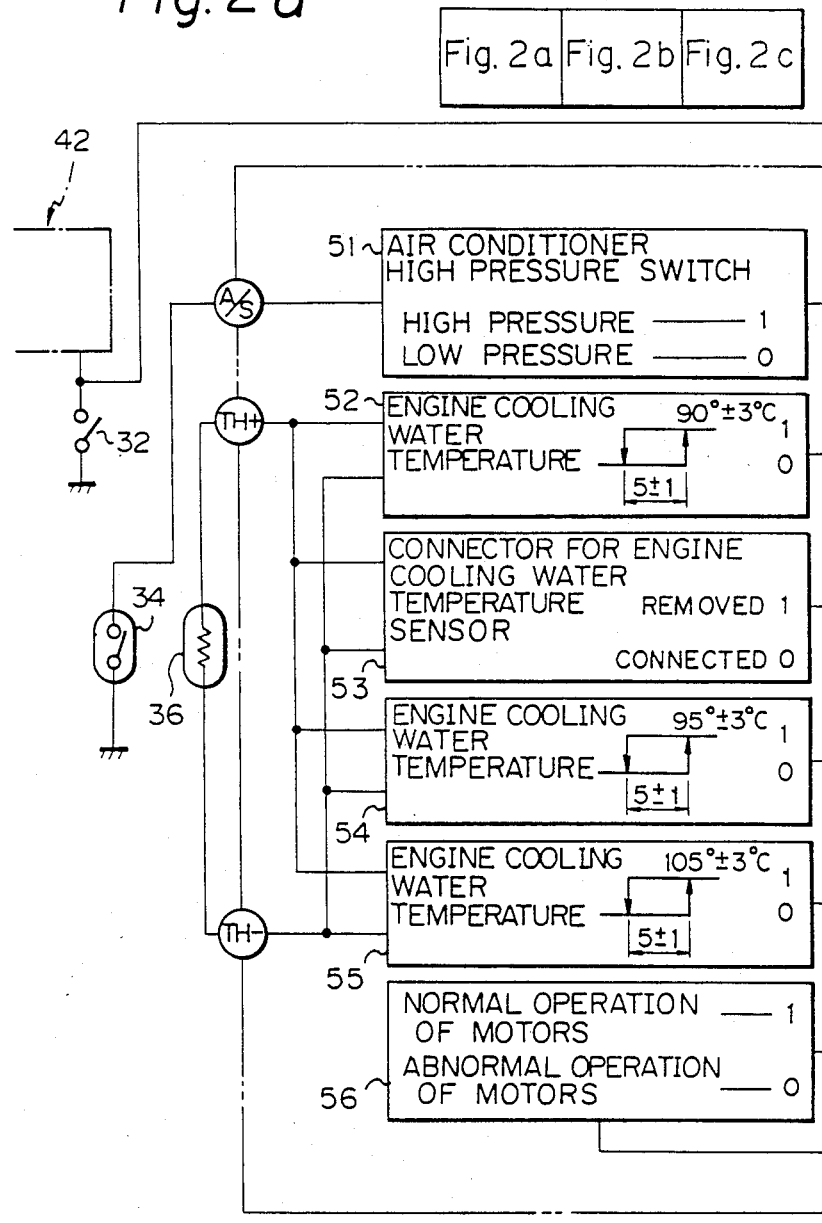

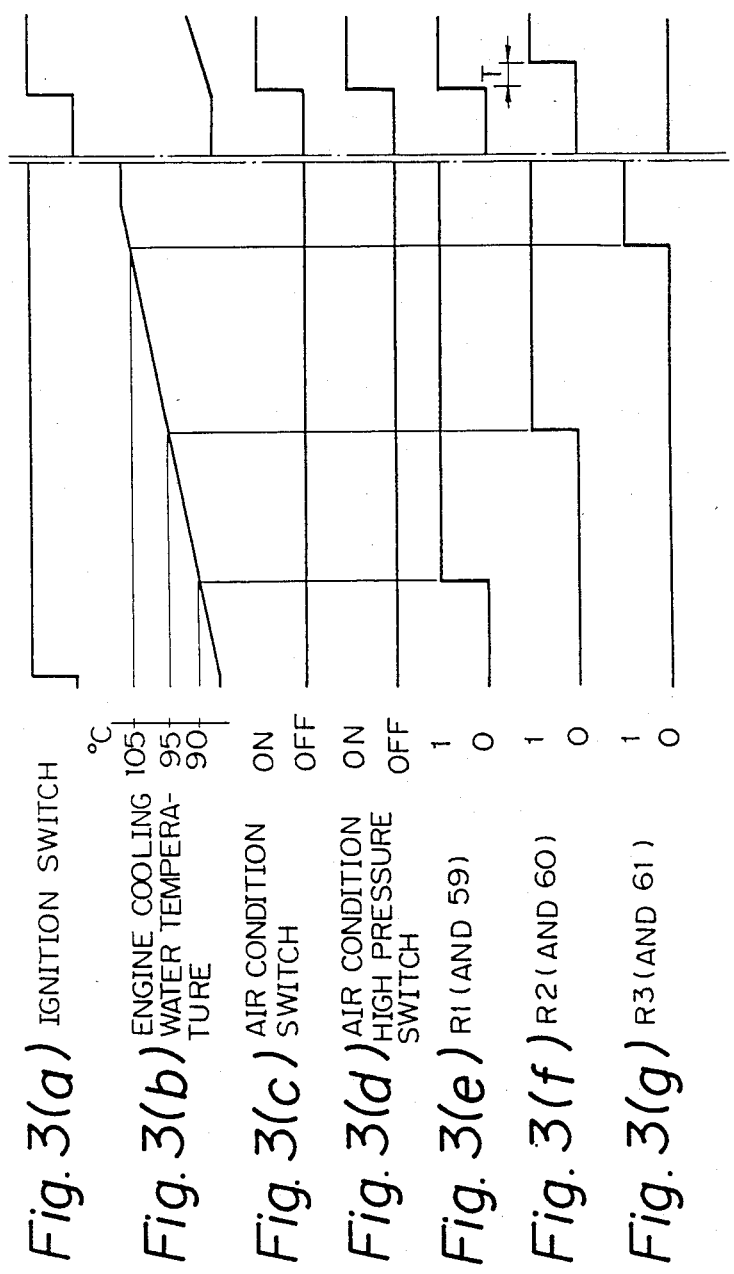

APPARATUS FOR CONTROLLING ROTATIONAL SPEED OF RADIATOR FAN

BACKGROUND OF THE INVENTION

1. Field of the Invention

The present invention relates to an apparatus for controlling the rotational speed of an electrically operated radiator fan in an internal combustion engine.

2. Description of the Related Art

In an electrically operated radiator fan device, the radiator fan is connected to an electric drive apparatus. The apparatus includes a first electric motor for a large electric current and a second electric motor for a small electric current. These first and second electric motors are selectively or simultaneously operated in accordance with the engine cooling requirements, such as the engine cooling water temperature or the condition of the air conditioner, to attain a desired fan speed which is sufficient to properly cool the radiator.

In this system, the large electric current motor and the small electric current motor are intended to operate sequentially in accordance with an increase in engine temperature. When the engine is started, the low electric current motor is first operated, since the engine temperature at that time is usually low. As a result of an increase in the engine cooling water temperature after the engine has been started, the large electric current motor is then operated. However, in a particular situation, conditions may arise wherein the small and large electric current motors should be simultaneously operated when the engine is started. In this case, a large rush current is generated in an electric circuit to operate relays for controlling the small and large electric current motors when the engine ignition switch is made ON to start the engine. This has an adverse effect on parts of the relays, such as the coils and contacts, from the viewpoint of a prolonged reliable service life thereof. To avoid this difficulty, it is easily conceivable to increase the electric capacity of these parts, but this is disadvantageous from the viewpoint of cost, and the need for the dimensions of the parts to be increased, which causes difficulties in the mounting of the device in a restricted space in the vehicle.

SUMMARY OF THE INVENTION

An object of the invention is to provide an apparatus capable of overcoming the above mentioned difficulties formed in the above system of the prior art.

According to the present invention, a system for cooling a radiator in an internal combustion engine is provided, comprising: rotating means for generating a flow of air in contact with the radiator for cooling an engine coolant in the radiator; electric driving means for driving the rotating means; sensor means for issuing electric signals representing various engine cooling requirements; first switch means, responsive to the electric signals indicating engine cooling requirements which are larger than a predetermined value, for operating the electric driving means in order to obtain a weak cooling by the rotating means; second switch means, responsive to the electric signals indicating engine cooling requirements which are larger than a predetermined value, for operating the electric driving means in order to obtain a strong cooling by the rotating means; and, a timer means for detecting a predetermined short period after the start of the engine for preventing the operation of the second switch means irrespective of the large cooling requirements.

BRIEF DESCRIPTION OF THE DRAWINGS

FIGS. 2 and 2a–c show details of the control circuit according to the present invention; and, FIGS. 3a–g show timing charts explaining the operation of the system according to the present invention.

DESCRIPTION OF A PREFERRED EMBODIMENT

Figure 1:
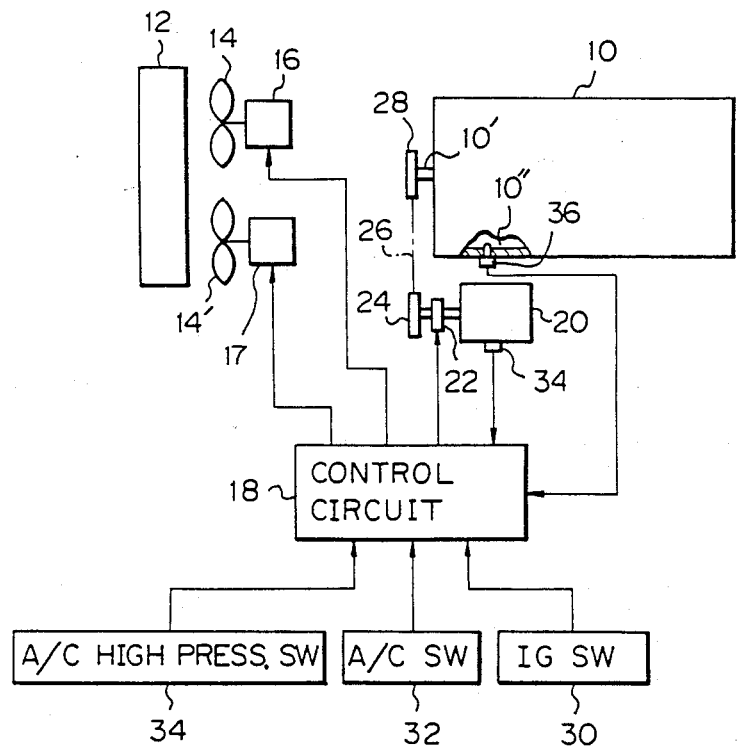
FIG. 1 is a general systematic view of the cooling system according to the present invention.

In FIG. 1, showing the embodiment of the present invention, 10 designates an internal combustion engine, and 12 a radiator. A pair of cooling fans 14 and 14' are arranged in parallel on the side of the radiator 12 facing the engine body 10 and are connected to a small electric motor 16, and a large electric motor 17, respectively. Reference numeral 18 denotes a control circuit designed so as to operate the cooling fans in response to the operation of the engine and/or an air conditioner system. The air conditioner system is provided with a compressor 20 which is connected to an electro-magnetic clutch 22 having an output shaft having a pulley 24 fixed thereon. The engine is provided with a crankshaft 10' having a pulley 28 fixed thereon, which is connected to the pulley 24 by way of a belt 26. The control circuit 18 is connected to an ignition switch 30 for starting the engine, a magnet switch (A/C switch) 32 for operating the air conditioner system, a switch 34 for sensing a high pressure condition in the air conditioner system, and an engine cooling water temperature sensor switch 36, so that the control circuit 18 attains a desired operation in response to signals from these switches. The magnet switch 32 controls the operation of the clutch 22 for rotating the compressor 20; the high pressure switch 34 detects a high pressure of the coolant housed in the compressor 20; and the temperature switch 36 is mounted on the engine body 10 so that it is in contact with the cooling water in a water jacket 10" of the engine body 10.

Figure 2B:
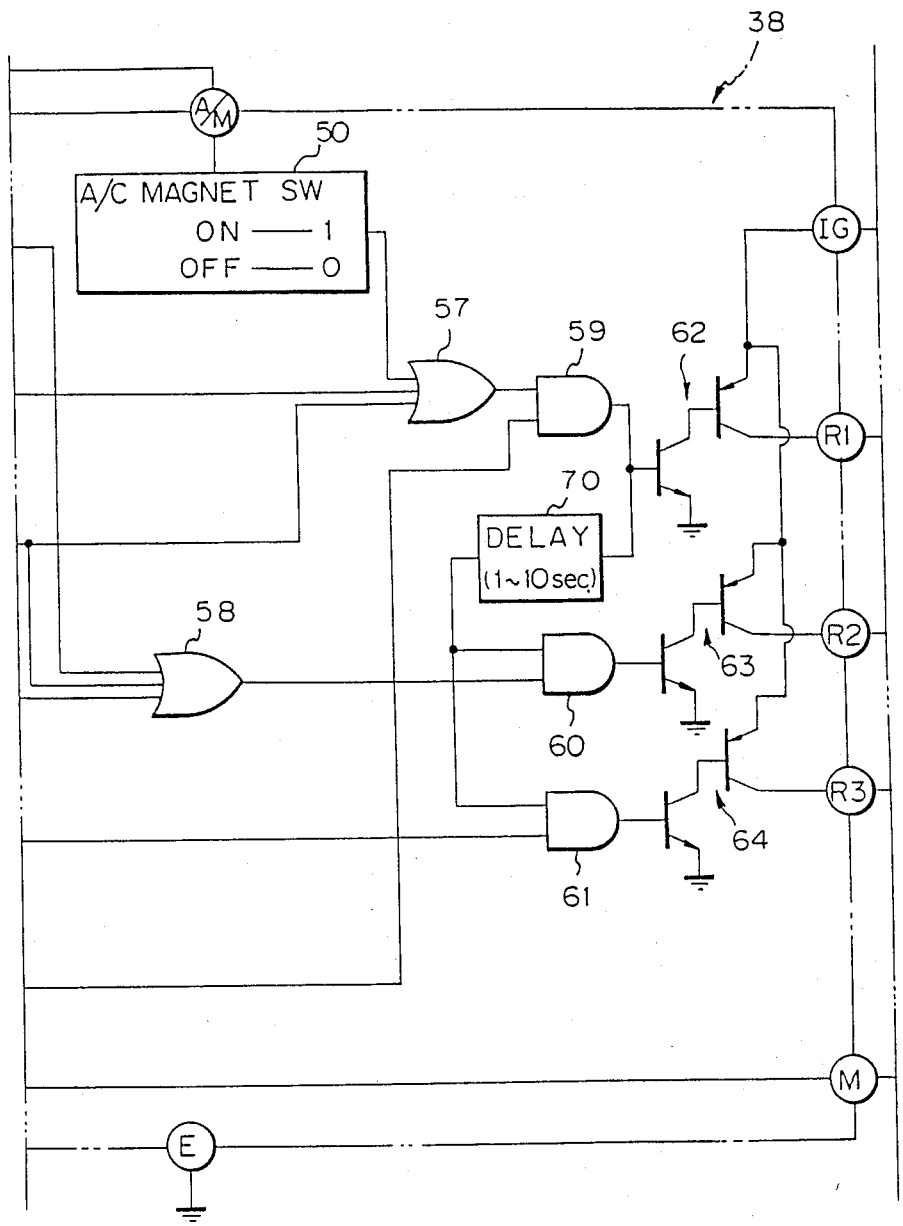
Figure 2C:
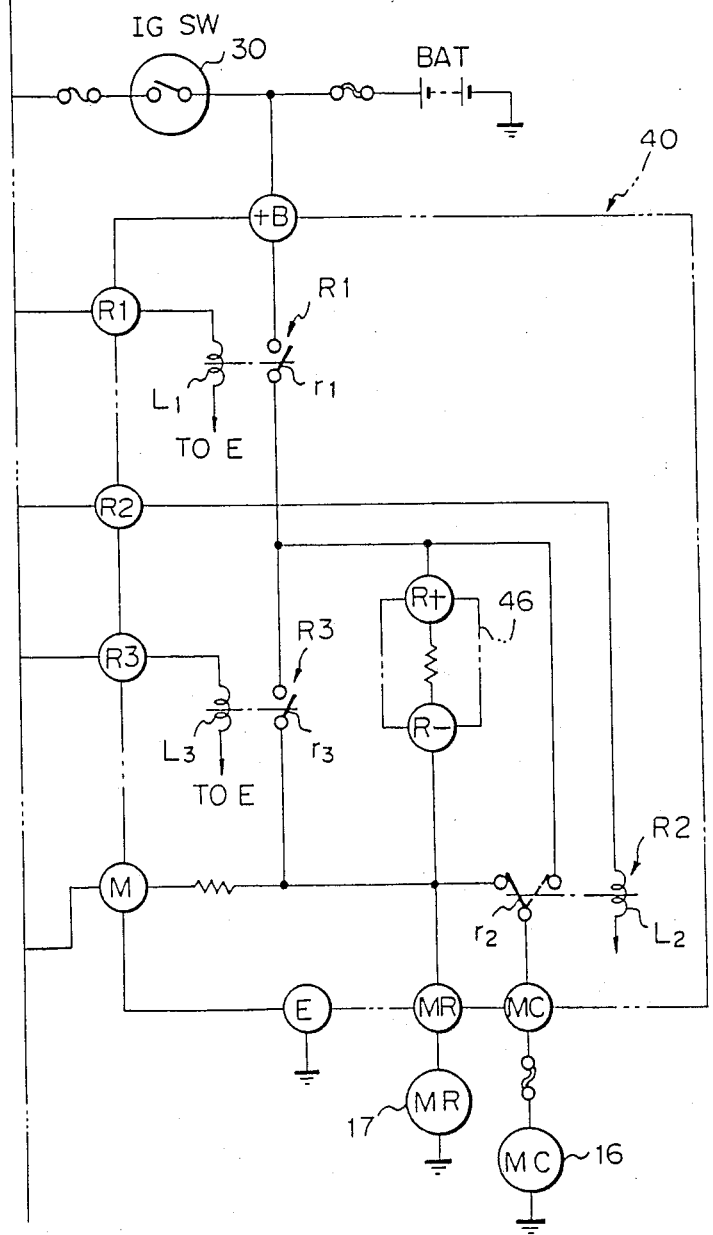

FIG. 2 shows a detailed construction of the control circuit 18 in FIG. 1. The control circuit 18 is provided with a cooling fan driving section 38, a relay section 40, and an air conditioner driving unit 42. A detailed construction of the unit 42 for operating the air conditioner, including the compressor 20, is omitted, since it is not directly related to the present invention. The relay section 40 is provided with first, second, and third relays $R_1$, $R_2$, and $R_3$. The first and third relays $R_1$ and $R_3$ have normally opened contacts $r_1$ and $r_3$, respectively, which are in series connection with a battery BAT on one side and a large motor 17 on the other side. The contact $r_1$ of the first relay $R_1$ is, at the side near the contact $r_3$, connected to a contact of the second relay $R_2$ which is in series connection with a small motor 16. The small motor 16 has windings having a small value resistance, such as 1.8Ω, and consumes an electric power of 80 W. The large motor 17 has windings having an electric resistance with a value of, e.g., 0.48Ω, and consumes an electric power of 300 W. A resistor element 46 having a value of, e.g., 0.46Ω, is arranged between the contact $r_1$ and the motor 17, so as to by-pass the contact $r_3$ of the third relay $R_3$. The contact $r_2$ of the second relay $R_2$ is switched between a condition wherein the first motor 16 is connected with the battery BAT via the resistance 46 and a condition where the first motor 16 is connected with the battery BAT without the intervention of the resistor 46.

The cooling fan driving unit 38 is for operating the first, second and third relays $R_1$, $R_2$, and $R_3$ in accordance with the conditions of the air conditioner system. A comparator 50 issues a "1" signal when the air conditioner magnet switch 32 is made ON, and a "0" signal when the switch 32 is made OFF. A comparator 51 issues a "1" signal when the air conditioner pressure switch is made ON due to the high pressure of the coolant in the compressor 20, and a "0" signal when the switch 32 is made OFF due to a low pressure of the coolant therein. A comparator 52 issues a "1" signal when the temperature of the engine cooling water sensed by the engine cooling water temperature sensor 36 rises above 90° C., and a "0" signal when the temperature falls below 85° C. A comparator 53 issues a "1" signal when a connector member (not shown) for a cable for connecting the engine cooling water temperature sensor 36 is not normally connected and a "0" signal when the connector is normally connected. A comparator 54 issues a "1" signal when the cooling water temperature rises above 95° C., and a "0" signal when the temperature falls below 90° C. A comparator 55 issues a "1" signal when the engine cooling water temperature rises above 105° C., and a "0" signal when the temperature falls below 100° C. A comparator 56 issues a "1" signal when the electric motors 16 and 17 are normally rotated, and a "0" signal when at least one of these motors 16 and 17 is overloaded due to a "lock" condition.

The respective inputs of the comparators 50, 52, and 53 are connected to a first OR gate 57. The respective inputs of the comparators 51, 53 and 54 are connected to a second OR gate 58. The outputs of the first OR gate 57 and the comparator 56 are connected to a first AND gate 59 at the respective inputs. The output of the first AND gate 59 and the output of the second OR gate 58 are connected to a second AND gate 60 at the respective inputs. Finally, the output of the first AND gate 59 and the comparator 55 are connected to a third AND gate 61 at the respective inputs.

The first AND gate 59 is for operating the first relay $R_1$, which gate 59 is connected to a base of a Darlington connected transistor unit 62. The transistor unit 62 has an emitter-collector circuit in which a coil $L_1$ of the first relay $R_1$ is arranged. The second AND gate 60 is for controlling the relay $R_2$, the output of which gate 60 is connected to a Darlington connected transistor unit 63 at the base thereof. The transistor unit 63 has an emitter-collector circuit in which a coil of the second relay $R_2$ is arranged. The third AND gate 61 is for controlling the third relay $R_3$, the output of which gate 61 is connected to a Darlington connected transistor unit 64 at the base thereof. The transistor unit 64 has an emitter-collector circuit in which a coil $L_3$ of the third relay $R_3$ is located.

The first AND gate 59 is connected not only to the transistor unit 62 for operating the first relay $R_1$ but also to the second and third AND gates 60 and 61 for operating the second and the third relays $R_2$ and $R_3$, respectively. As will be fully understood from the later description, such a connection allows the electric current in the electric motors 16 and 17 to be increased in a sequential manner in accordance with the cooling ability, as required, in order to attain a sufficient and a necessary cooling operation. This construction of the first AND gate 59 capable of controlling not only the first relay $R_1$ for the least cooling ability but also of controlling the second and the third relays $R_2$ and $R_3$, respectively, adapted for a much higher cooling ability, inevitably generates a condition wherein a plurality of relays $R_1$ and $R_2$ or $R_1$, $R_2$, and $R_3$ are simultaneously operated when a required cooling ability is high upon the start of the engine. When this situation occurs, a large amount of electric current is generated in the relay coils when the relays are energized, which will have an adverse effect on the durability of not only the coils but also the contacts $r_1$, $r_2$, and $r_3$. According to the improvement by the present invention, a delay unit such as a one-shot multi-vibrator 70 is arranged between the first AND gate 59 and the second and third AND gates 60 and 61. The delay unit 70 allows the operation of the second and the third AND gates 60 and 61 when a predetermined time, such as 1 to 10 seconds, has lapsed after the issuance of the trigger signal "1" from the first AND gate 59, as shown in FIG. 3-(e) and (f).

The operation of the device according to the present invention will be described hereinbelow.

During the normal engine running condition, when the temperature of the cooling water of the engine becomes higher than 90° C., the OR gate 57 is made ON, causing the first AND gate 59 to be made ON, so that the transistor unit 62 is made ON, causing the coil $L_1$ of the first relay $R_1$ to be energized (see FIG. 3-(e)). Thus, the contact $r_1$ is made ON and the small electric current motor 16 and the large electric current motor 17 are energized by way of a resistor element 46 for decreasing the electric current. Thus, the cooling fans 14 and 14' connected to the electric motors 16 and 17, respectively, attain a low speed rotation.

When the temperature of the cooling water rises above 95° C., the second OR gate 58 is made ON while the first AND gate 59 is maintained ON. Thus, the first and second transistor units 62 and 63 are made ON, causing the relay coils $R_1$ and $R_2$ to be energized, so that the relay contacts $r_1$ and $r_2$ are both made ON (see FIG. 3-(e and f)). Therefore, the small electric current motor 16 is directly connected to the battery BAT without the intervention of the resistance element 46, while the large electric current motor 17 is still connected via the element 46. Therefore, the rotational speed of the small electric current motor 16 connected to the fan 14 is increased, and accordingly, an increase in cooling capacity is obtained as a whole.

When the temperature of the cooling water becomes higher than 105° C., the third AND gate 61 is made ON while the first and second AND gates 59 and 60 are maintained ON (FIG. 3-(g)). Therefore, the transistor unit 64 is made ON so that the coil $L_3$ of the third relay $R_3$ is energized. Thus, the contact $r_3$ is made ON, so that not only the small electric current motor 16 but also the large electric current motor 17 is directly connected to the battery BAT without the intervention of the resistor element 46. Thus, the fans 14 and 14' attain their maximum rotational speed.

In addition to the above basic operation, the control of the rotational speed of the fans 14 and 14' is attained in accordance with the conditions of the air conditioning system. When the air conditioner magnet switch is made ON, because an air conditioner switch is made ON, the OR gate 57 issues a "1" signal, causing the transistor 62 to be made ON, so that the coil $L_1$ of the first relay $R_1$ is energized so as to make the contact $r_1$ to be ON. Thus, the small electric current motor 16 and the large electric current motor 17 are rotated at a decreased rotational speed, even if the engine cooling temperature is lower than 90° C. When the load of the air conditioner system is high, the comparator 51 produces a "1" signal due to the high pressure of the cooling medium in the compressor 20. In this case, the OR gate 58 issues a "1" signal, which causes the second AND gate 60 to issue a "1" signal while the first AND gate 59 issues a "1" signal. Thus, the transistor 63 is made ON, causing the second relay $R_2$ to be energized. Thus, the small electric current motor 16 attains a high rotational speed, and the large electric current motor 17 attains a low rotational speed.

Further, the following fail-safe operations are attained. If the connector of the engine cooling water temperature 36, which connector connects the sensor 36 with the electric control unit 18, is accidentally disconnected, a "1" signal is issued from the first OR gate 57 and second OR gate 58 for energizing the first and second relays $R_1$ and $R_2$. Thus, a highspeed rotational speed of the small electric current motor 16 and low rotational speed of the large electric current motor 17 are maintained. Furthermore, when a lock condition is detected by detecting a high electric current generated in the motor 16 or 17, the comparator 56 issues a "0" signal directed to the AND gate 59. Therefore, the AND gate 59 constantly issues a "0" signal irrespective of the conditions of the other comparator units 51 to 55. All of the relays 62, 63, and 64 are maintained in a de-energized condition, preventing the motors 16 and 17 from an overload.

When the engine is started, the relays $R_1$, $R_2$, and $R_2$ are, in most cases, in a condition wherein they are to be de-energized, since the temperature of the engine cooling water is low and the air conditioner is not in operation. However, in some cases, the relays are in a condition wherein they are to be operated when the engine is started. For example, when the engine cooling water temperature is higher than 95° C. or the high pressure sensor 51 is ON at the same time as when the engine is to be started, not only the first relay $R_1$ but also the second relay $R_2$ and/or the third relay $R_2$ are simultaneously in a condition to be energized. In this case, the first AND gate 59 issues a "1" signal at the same time as the start of the engine, for energizing the first relay $R_1$ and attaining a low rotational speed of the fans 14 and 14'. However, the "1" signal from the first AND gate 59 cannot be immediately transmitted to the second and third AND gates 60 and 61, due to the existence of the one-shot multivibrator 70. After the lapse of the short period T from the start of the engine, the delay unit 70 allows the transmission of a "1" signal from the first AND gate 59 to the second and/or third AND gates 60 and 61, allowing the relays $R_2$ and $R_3$ to be energized. Due to the delay of the operation of the relays $R_2$ and $R_3$, a rush current in the relay control circuit is prevented, allowing the life of the relay coils and relay contacts to be prolonged.

While the present invention is described with reference to a particular embodiment described in the drawings as attached, many modifications and changes may be made by those skilled in this art without departing from the scope and spirit of the present invention.

I claim:

1. A system for cooling an radiator in an internal combustion engine, comprising:
    rotating means for generating a flow of air in contact with the radiator for cooling an engine coolant medium in the radiator;
    electric driving means for driving said rotating means;
    sensor means for issuing electric signals representing various cooling requirements of the engine;
    first switch means, responsive to said electric signals indicating an engine cooling requirement which is larger than a predetermined value, for operating said electric driving means in order to obtain a weak cooling by the rotating means;
    second switch means, responsive to said electric signals indicating an engine cooling requirement which is larger than a predetermined value, for operating said electric driving means in order to obtain a much stronger cooling by the rotating means; and,
    timer means for detecting a predetermined short period after the start of the engine for preventing the operation of the second switch means irrespective of said large cooling requirement.

2. A system according to claim 1, wherein said rotating means comprise a first fan member and a second fan member which are capable of being driven separately, said electric driving means comprising a first motor for a small electric current connected to the first fan member and a second motor for a large electric current, and further comprising an electric resistance member arranged between the first switch member and the second motor, and said second switch means is, in accordance with the cooling requirement, switched to selectively by-pass the electric resistance member.

3. A system according to claim 2, further including a third switch means, responsive to said electric signals indicating a requirement which is larger than a predetermined value for operating said second motor in order to attain the stronger engine cooling requirement, said switch means being arranged between the first switch means and the second motor so that the third switch means selectively by-passes said resistance member, said timer means also preventing the operation of the third switch means during said short period from the start of the engine.

4. A system according to claim 1, wherein said sensor means sense a temperature of an engine coolant medium so as to produce an electric signal indicating the temperature of said engine cooling medium.

5. A system according to claim 1, wherein the engine is provided with an air conditioner system operated by rotation of the engine, and said sensor means sense various operating conditions of the air conditioner system.

6. A system according to claim 5, wherein said sensor means comprise a first detector detecting an operating condition of the air conditioner, corresponding to the weak cooling requirement and a second detector for detecting a high pressure of the cooling medium of the air conditioner, corresponding to the strong cooling requirement.

7. A system according to claim 1, wherein said sensor means sense various fail-safe conditions to provide an electric signal indicating the requirement of a cooling effect.

* * * * *